(12) United States Patent
Park et al.

(10) Patent No.: US 11,454,808 B2
(45) Date of Patent: Sep. 27, 2022

(54) METALENS AND OPTICAL APPARATUS INCLUDING THE SAME

(71) Applicant: SAMSUNG ELECTRONICS CO., LTD., Suwon-si (KR)

(72) Inventors: Hyunsung Park, Suwon-si (KR); Seunghoon Han, Seoul (KR); Hyeonsoo Park, Suwon-si (KR); Changgyun Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 318 days.

(21) Appl. No.: 16/865,554

(22) Filed: May 4, 2020

(65) Prior Publication Data

US 2020/0355913 A1 Nov. 12, 2020

(30) Foreign Application Priority Data

May 7, 2019 (KR) ............ 10-2019-0053244
Apr. 8, 2020 (KR) ............ 10-2020-0042974

(51) Int. Cl.
| | |
|---|---|
| *G02B 27/14* | (2006.01) |
| *G02B 27/00* | (2006.01) |
| *G02B 26/06* | (2006.01) |
| *G02B 1/00* | (2006.01) |

(52) U.S. Cl.
CPC ......... *G02B 27/0025* (2013.01); *G02B 1/002* (2013.01); *G02B 26/06* (2013.01)

(58) Field of Classification Search
CPC ..... G02B 27/0025; G02B 1/002; G02B 26/06
USPC ........................................... 359/637
See application file for complete search history.

(56) References Cited

U.S. PATENT DOCUMENTS

| | | |
|---|---|---|
| 2018/0216797 A1 | 8/2018 | Khorasaninejad et al. |
| 2019/0049632 A1 | 2/2019 | Shin et al. |
| 2019/0064532 A1 | 2/2019 | Riley, Jr. et al. |
| 2019/0086579 A1 | 3/2019 | Kim et al. |
| 2020/0264343 A1 | 8/2020 | Han et al. |
| 2021/0103075 A1* | 4/2021 | Park ................ G02B 3/04 |

FOREIGN PATENT DOCUMENTS

| | | |
|---|---|---|
| KR | 10-2019-0033283 A | 3/2019 |
| WO | 2018/204856 A1 | 11/2018 |

* cited by examiner

*Primary Examiner* — William Choi
(74) *Attorney, Agent, or Firm* — Sughrue Mion, PLLC

(57) ABSTRACT

Provided is a metalens including a first metasurface including a plurality of first nanostructures disposed based on a first shape distribution, and a second metasurface spaced apart from the first metasurface at a distance greater than a central wavelength of a predetermined wavelength band, the second metasurface including a plurality of second nanostructures disposed based on a second shape distribution, wherein the metalens provides chromatic aberration for light in the predetermined wavelength band.

27 Claims, 22 Drawing Sheets

METALENS AND OPTICAL APPARATUS INCLUDING THE SAME

CROSS-REFERENCE TO RELATED APPLICATION

This application claims priority from Korean Patent Application Nos. 10-2019-0053244, filed on May 7, 2019, and 10-2020-0042974, filed on Apr. 8, 2020 in the Korean Intellectual Property Office, the disclosures of which are incorporated herein in their entireties by reference.

BACKGROUND

1. Field

Example embodiments of the present disclosure relate to a metalens and an optical apparatus including the same.

2. Description of Related Art

Optical sensors using semiconductor-based sensor arrays are increasingly used in mobile devices, wearable devices, and the Internet of Things (IoT).

Although miniaturization of these devices is required, it is difficult to reduce the thickness of optical lens included in the devices. This is because that, in a lens of which optical performance is adjusted using curvature, as the radius of curvature decreases, the refractive power increases, and as the radius of curvature decreases, the thickness occupied by the lens increases in the optical axis direction.

Accordingly, attempts have been made to implement a flat and thin lens based on a metasurface. However, there are still difficulties in realizing desired refractive power, controlling chromatic aberration, and the like.

SUMMARY

One or more example embodiments provide metalenses capable of realizing desired refractive power and chromatic aberration for light in a multi-wavelength band.

Additional aspects will be set forth in part in the description which follows and, in part, will be apparent from the description, or may be learned by practice of the example embodiments.

According to an aspect of an example embodiment, there is provided a metalens including a first metasurface including a plurality of first nanostructures disposed based on a first shape distribution, and a second metasurface spaced apart from the first metasurface at a distance greater than a central wavelength of a predetermined wavelength band, the second metasurface including a plurality of second nanostructures disposed based on a second shape distribution, wherein the metalens provides chromatic aberration for light in the predetermined wavelength band.

The first metasurface may be configured to delay a phase of incident light based on the first shape distribution by a phase delay equation $\varphi_1(r)=ar^2$, where r is a distance from a center of the first metasurface to a position of the incident light, and a is a real number.

The first shape distribution may be determined such that the phase delay equation of the first metasurface with respect to light of different wavelengths in the predetermined wavelength band is equal.

The second metasurface may be configured to delay a phase of incident light based on the second shape distribution by a phase delay equation $\varphi_2(r)=br^2$, where r is the distance from a center of the second metasurface to a position of the incident light, and b is a real number that is different from a.

The second shape distribution may be determined such that the phase delay equation of the second metasurface with respect to light of different wavelengths in the predetermined wavelength band is equal.

One of the first metasurface and the second metasurface may have a positive refractive power and the other of the first metasurface and the second metasurface may have a negative refractive power with respect to light of the central wavelength.

A first focal length of the first metasurface with respect to light of the central wavelength, a second focal length of the second metasurface with respect to the light of the central wavelength, and the distance between the first metasurface and the second metasurface may be set such that a refractive power of the metalens with respect to the light of the central wavelength is zero.

The distance between the first metasurface and the second metasurface may be greater than five times the central wavelength.

The predetermined wavelength band may be included in a wavelength band from visible light to infrared light.

Each of the plurality of first nanostructures and each of the plurality of second nanostructures respectively may have a column shape.

A width of each of the plurality of first nanostructures and a width of each of the plurality of second nanostructures may be less than the central wavelength.

A height of each of the plurality of first nanostructures and a height of each of the plurality of second nanostructures may be equal to or greater than half of the central wavelength.

The metalens may further include a substrate having a first surface and a second surface facing each other, wherein the plurality of first nanostructures are disposed on the first surface, wherein the plurality of second nanostructures are disposed on the second surface.

The metalens may further include a first protective layer covering the plurality of first nanostructures and including a material having a refractive index lower than a refractive index of each of the plurality of first nanostructures, and a second protective layer covering the plurality of second nanostructures and including a material having a refractive index lower than a refractive index of each of the plurality of second nanostructures.

At least one of the first protective layer and the second protective layer may have a curved surface.

One of the first protective layer and the second protective layer may have a convex curved surface, and the other may have a concave curved surface.

The metalens may further include a first substrate, the plurality of first nanostructures being disposed on the first substrate, and a second substrate, the plurality of second nanostructures being disposed on the second substrate.

The metalens may further include a first protective layer covering the plurality of first nanostructures and including a material having a refractive index lower than a refractive index of each of the plurality of first nanostructures, and a second protective layer configured to cover the plurality of second nanostructures and including a material having a refractive index lower than a refractive index of each of the plurality of second nanostructures.

At least one of the first protective layer and the second protective layer may have a curved surface.

A back surface opposite to a surface of the first substrate on which the plurality of first nanostructures are disposed and a back surface opposite to a surface of the second substrate on which the plurality of second nanostructures are disposed may be bonded to each other.

The plurality of first nanostructures and the plurality of second nanostructures may be disposed to face each other.

The metalens may further include a substrate, the plurality of first nanostructures being disposed on the substrate, and a first protective layer covering the plurality of first nanostructures and including a material having a refractive index lower than a refractive index of each of the plurality of first nanostructures, wherein the plurality of second nanostructures are disposed on the first protective layer.

The metalens may further include a second protective layer covering the plurality of second nanostructures and including a material having a refractive index lower than a refractive index of each of the plurality of second nanostructures.

The second protective layer may have a curved surface.

According to another aspect of an example embodiment, there is provided an imaging lens including a lens assembly including one or more refractive lenses, and a metalens including a first metasurface including a plurality of first nanostructures disposed based on a first shape distribution, and a second metasurface spaced apart from the first metasurface at a distance greater than a central wavelength of a predetermined wavelength band, the second metasurface including a plurality of second nanostructures disposed based on a second shape distribution, wherein the metalens provides chromatic aberration for light in the predetermined wavelength band.

The chromatic aberration provided by the metalens may lower the chromatic aberration provided by the lens assembly, and wherein a focal length of the imaging lens is equal to a focal length of the lens assembly.

According to another aspect of an example embodiment, there is provided an imaging device including an imaging lens including a lens assembly including one or more refractive lenses, and a metalens including a first metasurface including a plurality of first nanostructures disposed based on a first shape distribution, and a second metasurface spaced apart from the first metasurface at a distance greater than a central wavelength of a predetermined wavelength band, the second metasurface including a plurality of second nanostructures disposed based on a second shape distribution, wherein the metalens provides chromatic aberration for light in the predetermined wavelength band, and an image sensor configured to convert an optical image formed by the imaging lens into an electrical signal.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
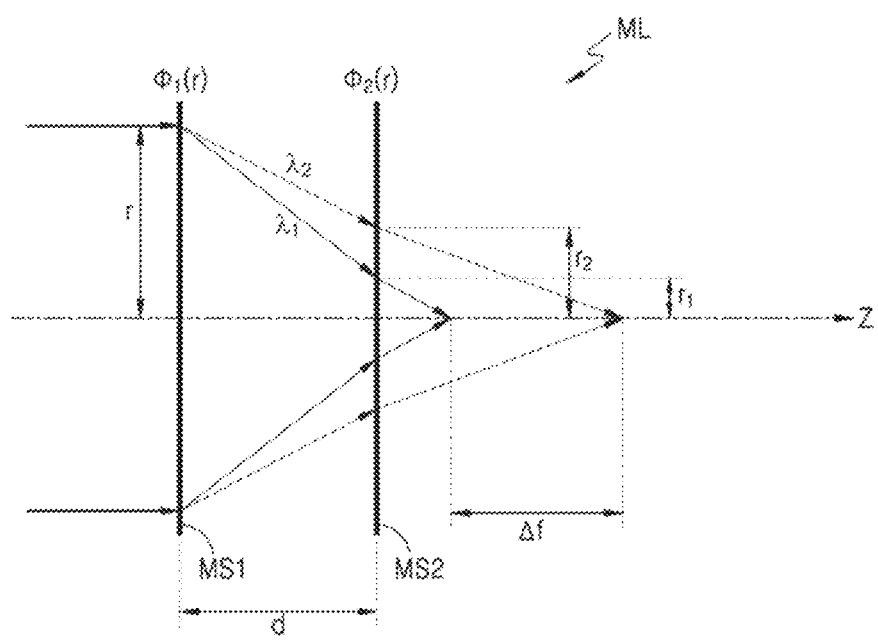
FIG. 1 is a conceptual diagram illustrating the propagation of light of different wavelengths of two metasurfaces provided in a metalens according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. Example embodiments described are merely exemplary, and various modifications are possible from these embodiments.

In the drawings below, like reference numerals refer to like elements, and the size of each component in the drawings may be exaggerated for clarity and convenience of description.

Hereinafter, what is described as "upper" or "on" may include not only directly over in contact but also over not in contact.

Terms such as "first" and "second" may be used to describe various components, but are used only for the purpose of distinguishing one component from other components. These terms do not limit the difference in materials or structures of the components.

The terms of a singular form may include plural forms unless otherwise specified. Also, when a part "includes" a component, this means that, unless specifically stated otherwise, it may further include other components rather than excluding other components.

In addition, the terms "part", "module", and the like, which are described in the specification, mean a unit for processing at least one function or operation, and the unit may be implemented in hardware or software, or in a combination of hardware and software.

The use of the term "above" and similar indication terms may correspond to both singular and plural.

The steps that make up a method may be done in a suitable order, unless there is a clear statement that they should be done in the order described. In addition, the use of all exemplary terms (e.g., and the like) is merely for describing the technical idea in detail, and the scope of rights is not limited by these terms unless it is limited by the claims.

Figure 2A:
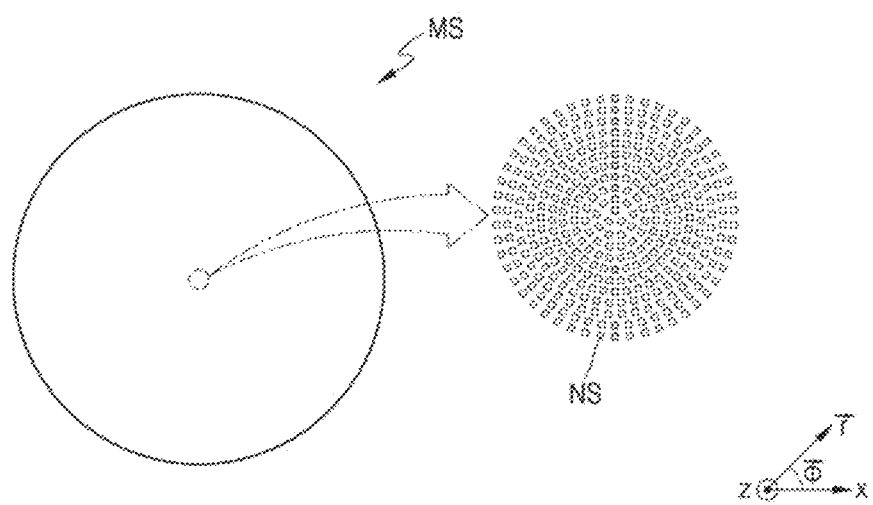
FIG. 2A is a plan view showing an exemplary shape of a metasurface provided in a metalens according to an example embodiment.
Figure 2B:
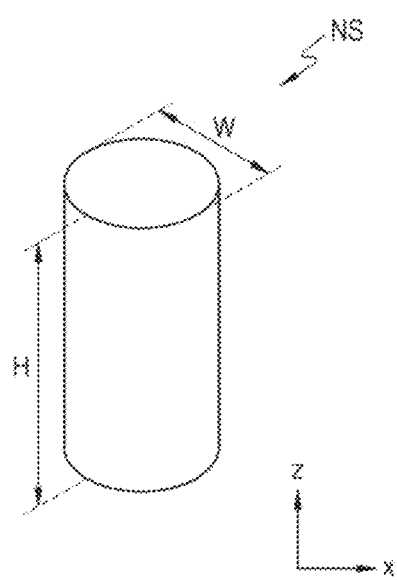
FIG. 2B is a perspective view showing an exemplary shape of a nanostructure provided in a metasurface.

FIG. 1 is a conceptual diagram illustrating propagation of light of different wavelengths through two metasurfaces provided in a metalens according to an example embodiment. FIG. 2A is a plan view showing an exemplary shape of a metasurface provided in a metalens according to an example embodiment, and FIG. 2B is a perspective view showing an exemplary shape of a nanostructure provided in a metasurface according to an example embodiment.

A metalens ML includes a first metasurface MS1 and a second metasurface MS2 spaced apart from each other. The first meta-surface MS1 and the second meta-surface MS2 are configured to implement a predetermined transmission phase distribution by modulating the phase of incident light according to the position of the incident light. The predetermined transmission phase distribution may be set such that the metalens ML exhibits desired refractive power and chromatic aberration for incident light in a predetermined wavelength band. The distance between the first metasurface MS1 and the second metasurface MS2 may be greater than the center wavelength $\lambda_0$ of the predetermined wavelength band. The predetermined wavelength band may be a band included in a range including a visible light range and an infrared range, but is not limited thereto.

The first meta-surface MS1 and the second meta-surface MS2 may be configured to have a phase delay function for incident light in the forms of $\varphi_1(r)$ and $\varphi_2(r)$, respectively. $\varphi_1(r)$ and $\varphi_2(r)$ may be in the form of predetermined refractive power for incident light. For example, the incident light may converge or diverge through the first metasurface MS1 and the second metasurface MS2.

$\varphi_1(r)$ may satisfy $\varphi_1(r)=ar^2$, where r is the distance from the center of the first metasurface MS1 and a is a real number. That is, $\varphi_1(r)$ is represented as a function of the distance from the center of the first metasurface MS1, and has little dependence on the wavelength of incident light. In other words, the first metasurface MS1 may have substantially the same function $\varphi_1(r)$ for light of different wavelengths $\lambda_1$ and $\lambda_2$ in a predetermined wavelength band. Accordingly, the light of the first wavelength $\lambda_1$ and the light of the second wavelength $\lambda_2$ incident on the first metasurface MS1 have different transmission phase distributions, and are diffracted and deflected at different angles.

$\varphi_2(r)$ may satisfy $\varphi_2(r)=br^2$, where r is the distance from the center of the second metasurface MS2, and b is a real number different from a. That is, $\varphi_2(r)$ is represented as a function of the distance from the center of the second metasurface MS2, and has little dependence on the wavelength of incident light. In other words, like the first metasurface MS1, the second metasurface MS2 may have substantially the same function $\varphi_2(r)$ for light of different wavelengths $\lambda_1$ and $\lambda_2$ in a predetermined wavelength band. Accordingly, the light of the first wavelength $\lambda_1$ and the light of the second wavelength $\lambda_2$ incident on the first metasurface MS2 have different transmission phase distributions, and are deflected at different angles.

The transmission phase distribution of the incident light is determined according to the phase delay function, and hereinafter, the expressions of the phase delay function and the transmission phase distribution may be used interchangeably.

By the phase delay function represented by the first metasurface MS1, light of different wavelengths is deflected in a different degree after passing through the first metasurface MS1 to follow different optical paths. Due to this path difference, the light of the first wavelength $\lambda_1$ and the light of the second wavelength $\lambda_2$ enter the second metasurface MS2 at different positions and angles. As illustrated in the drawing, the light of the first wavelength $\lambda_1$ and the light of the second wavelength $\lambda_2$ enter the second metasurface MS2 at the respective positions of the distances $r_1$ and $r_2$ from the center of the second metasurface MS2. According to the phase delay function represented by the second metasurface MS2, the transmission phase distributions of the light of the first wavelength $\lambda_1$ and the light of the second wavelength $\lambda_2$ are changed and diffracted and deflected in different degrees.

The light of the first wavelength $\lambda_1$ and the light of the second wavelength $\lambda_2$ passing through the first metasurface MS1 and the second metasurface MS2, respectively, may form different focal points. This focal dispersion of which is a difference in the focal point of the first wavelength $\lambda_1$ and the focal point of the light of the second wavelength $\lambda_2$, may be represented as chromatic aberration. Various focal lengths and chromatic aberration characteristics may be implemented by adjusting the phase delay functions represented by the first metasurface MS1 and the second metasurface MS2.

The first metasurface MS1 and the second metasurface MS2 may have opposite refractive powers. One of the first metasurface MS1 and the second metasurface MS2 may have a positive refractive power, and the other may have a negative refractive power. The positive refractive power is a property of converging light and may be expressed as a positive focal length, and the negative refractive power is a property of diverging light and may be expressed as a negative focal length. Hereinafter, since the refractive power and the focal length are wavelength-dependent, the refractive power and the focal length with respect to a central wavelength $\lambda_0$ within the operating wavelength of the metalens ML will be described.

One of the first metasurface MS1 and the second metasurface MS2 has a positive refractive power and the other has a negative refractive power, thereby increasing the range of chromatic aberrations implemented by the metalens ML. Furthermore, detailed adjustment of chromatic aberration implemented by the metalens ML may be facilitated by allowing the interval d between the first metasurface MS1 and the second metasurface MS2 to be larger than the wavelength $\lambda_0$. For example, this interval d may be greater than $5\lambda_0$. However, embodiments are not limited thereto. For example, the interval d may be greater than $10\lambda_0$, or greater than $100\lambda_0$.

For the metalens ML to have a relatively low refractive power, for example, for the refractive power of each of the first metasurface MS1 and the second metasurface MS2 to be canceled, a focal length of the first metasurface MS1, a focal length of the second metasurface MS2, and an interval between the first metasurface MS1 and the second metasurface MS2 may be determined. The metalens ML may be used as a lens that corrects chromatic aberration without affecting the overall focal length by being combined with other lenses.

The first metasurface MS1 and the second metasurface MS2 may have a metasurface MS as illustrated in FIG. 2A according to an example embodiment. The plurality of nanostructures NS may be arranged along a plurality of ring shapes on the metasurface MS. The shape and size at each position of the nanostructure NS may be defined as a function of the distance r from the center of the metasurface MS, and may have a polar symmetrical distribution. However, embodiments are not limited thereto.

The shape and size at each position of the nanostructure NS may be determined according to a phase delay function that the metasurface MS is configured to implement. That is, the first metasurface MS1 may include a plurality of nanostructures having a first shape distribution to implement the phase delay function $\varphi_1(r)$, and the second metasurface MS2 may include a plurality of nanostructures having a second shape distribution to implement a phase delay function $\varphi_2(r)$.

The nanostructure NS, as shown in FIG. 2B, for example, may have a cylindrical shape having a height H and a diameter W. However, the shape of the nanostructure NS is not limited thereto. For example, the nanostructure NS may have a pillar shape having a cross-section of various shapes in which a height and a width may be defined. The cross-sectional shape of the nanostructure NS may be polygonal, elliptical, or various other shapes.

The width W of the nanostructure NS may be less than the operating wavelength of the metalens ML, that is, the center wavelength $\lambda_0$ of the predetermined wavelength band, and the height H of the nanostructure NS may be more than half of the center wavelength $\lambda_0$.

Figure 3:
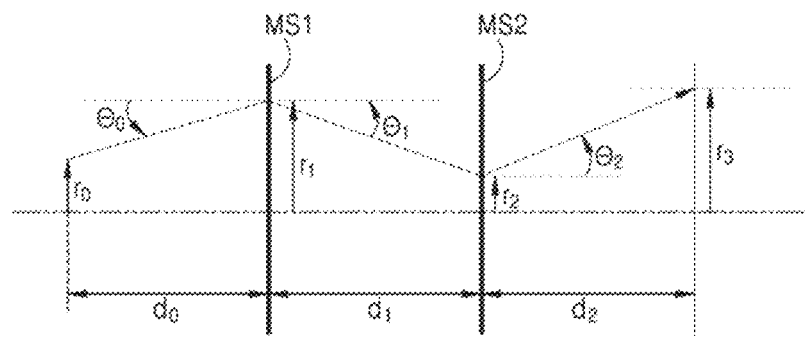
FIG. 3 is a view showing the position of a light beam with a distance from an optical axis and an angle of incidence to a metasurface in order to explain the displacement of the light beam by metasurfaces.

FIG. 3 illustrates the position of light at a distance from an optical axis and an angle of incidence on a metasurface to illustrate the displacement of the light by metasurfaces.

Using the paraxial approximation, the action of a first metasurface MS1 and a second metasurface MS2 may be viewed as equations. As shown in FIG. 3, when the initial position of the light and the angle of incidence are $r_0$ and $\theta_0$, respectively, the displacement $r_3$ of the light passing through the first metasurface MS1 and the second metasurface MS2 may be expressed by Equation 1 below.

$$r_3 \approx \quad \text{[Equation 1]}$$
$$r_0 + \left(d_0 + \frac{d_1}{n} + d_2\right)\theta_0 + \left(\frac{d_1}{n} + d_2\right)\frac{n\lambda}{2\pi}\phi'_1(r_1) + d_2\frac{\lambda}{2\pi}\phi'_2(r_2)$$

where $$\phi'_i = \frac{\partial \phi_i(r)}{\partial r}, \quad r_1 \approx r_0 + d_0\theta_0 \text{ and}$$
$$r_2 \approx r_1 + \frac{d_1}{n}\theta_0 + \frac{d_1\lambda}{2\pi}\phi'_1(r_1)$$

Here, $\varphi_1(r)$ is the transmission phase distribution by the first metasurface MS1, and $\varphi_2(r)$ is the transmission phase distribution by the second metasurface MS2.

The conditions in which the first metasurface MS1 and the second metasurface MS2 form a lens may be expressed as in Equation 2 below assuming vertical incidence of light.

$$\theta_0 \approx 0 \quad \text{[Equation 2]}$$

$$\frac{\delta r_3}{\delta r_0} = 1 + k_0^{-1}(d_1 + nd_2)\phi''_1(r_0) + k_0^{-1}d_2\phi''_2(r_2) + k_0^{-2}d_1 d_2 \phi''_1(r_0)\phi''_2(r_2) = 0$$

According to these lens formation configurations, the focal length of the lens composed of the first metasurface MS1 and the second metasurface MS2 may be expressed as in the following Equation 3.

$$f(r_0, \phi''_1, \phi''_2) = -\frac{k_0^2 + k_0 d_1 \phi''_1(r_0)}{k_0(n\phi''_1(r_0) + \phi''_2(r_2)) + d_1\phi''_1(r_0)\phi''_2(r_2)} \quad \text{[Equation 3]}$$

In Equations 1, 2 and 3, n is a refractive index of the metasurfaces, $\lambda$ is a wavelength of the incident light, and $k_0$ is defined as in Equation 4 below.

$$k_0 A \frac{2\pi}{\lambda} \quad \text{[Equation 4]}$$

Chromatic aberration a is defined as in Equation 5 below.

$$\alpha A \frac{f}{\lambda} \frac{d\lambda}{df} \quad \text{[Equation 5]}$$

Figure 4A:
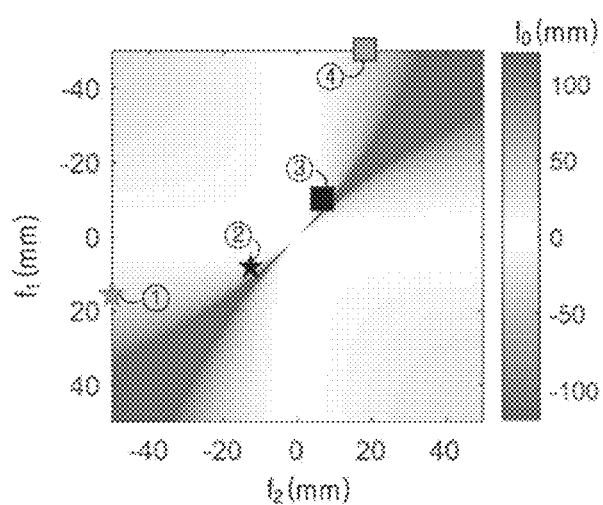
FIGS. 4A and 4B are maps showing a focal length and chromatic aberration of a metalens from a combination of focal lengths of two metasurfaces spaced at a predetermined interval.
Figure 4B:
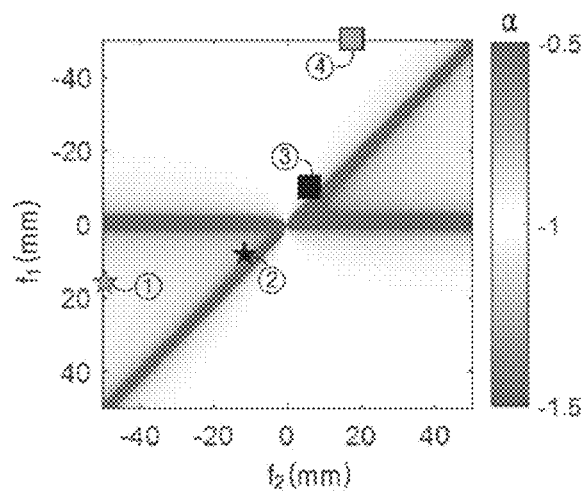

FIGS. 4A and 4B are maps showing a focal length and chromatic aberration of a metalens from a combination of focal lengths of two metasurfaces spaced at a predetermined interval. The focal length is for light with a center wavelength of 800 nm.

In FIG. 4A, the vertical axis represents the focal length $f_1$ of the first metasurface MS1, and the horizontal axis represents the focal length $f_2$ of the second metasurface MS2. The interval between the first metasurface MS1 and the second metasurface MS2 is 1 mm. The combined focal length $f_0$ by these two metasurfaces becomes a value displayed on the two-dimensional map shown.

In FIG. 4B, the chromatic aberration a is displayed on a two-dimensional map in which the focal length $f_1$ of the first metasurface MS1 is the vertical axis and the focal length $f_2$ of the second metasurface MS2 is the horizontal axis.

The points displayed in FIG. 4A are selected as arbitrary four points ①, ②, ③, and ④ at the positions of the same focal length $f_0$. FIG. 4B illustrates that the chromatic aberration corresponding to the position is different from each other.

By using the focal length map and chromatic aberration map, the phase delay function of each metasurface may be designed, and desired focal length and chromatic aberration may be implemented.

Figure 4C:
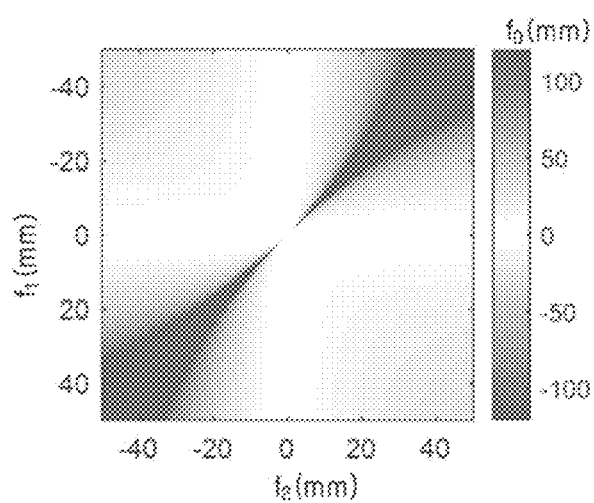
FIGS. 4C and 4D are maps showing a focal length and chromatic aberration of a metalens from a combination of focal lengths of two metasurfaces spaced at another predetermined interval.
Figure 4D:
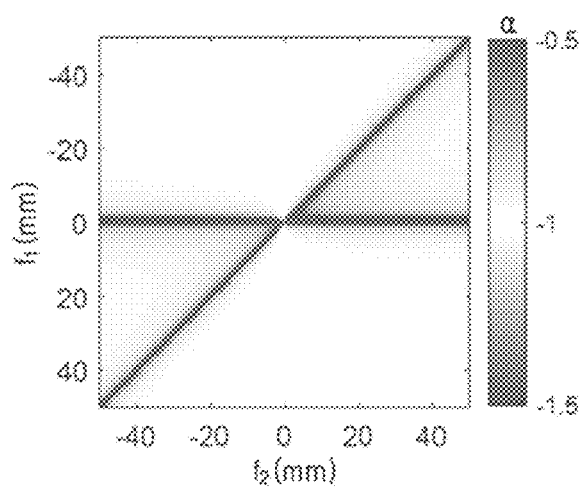
Figure 5A:
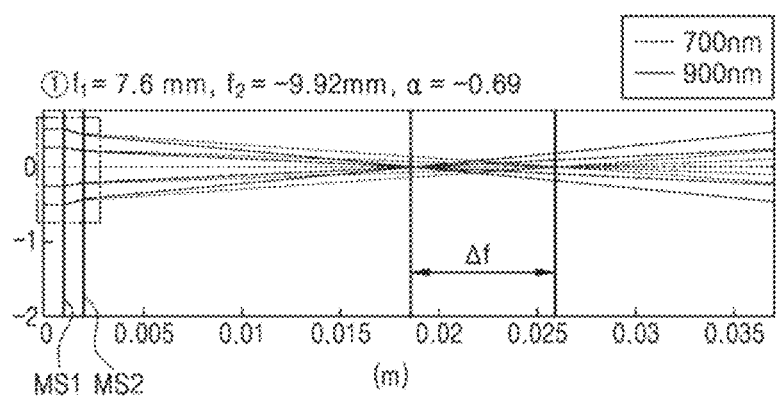
FIGS. 5A to 5D show focus characteristics of metalenses corresponding to four points shown in FIG. 4A using a ray tracing technique.
Figure 5B:
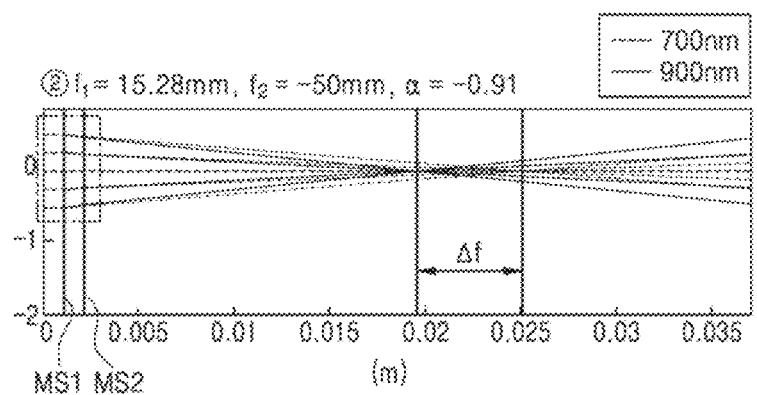
Figure 5C:
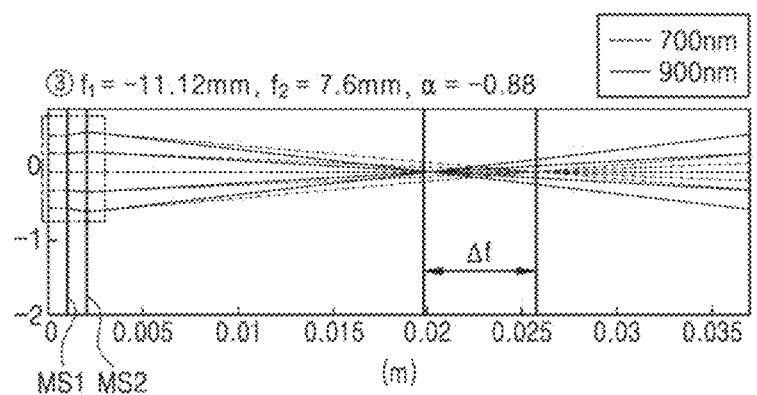
Figure 5D:
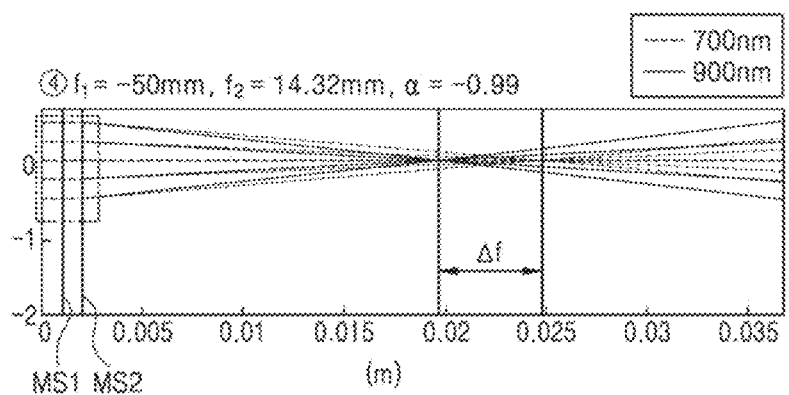

FIGS. 4C and 4D are maps showing a focal length and chromatic aberration of a metalens from a combination of focal lengths of two metasurfaces spaced at another predetermined interval.

Referring to FIGS. 4C and 4D, the interval between the first metasurface MS1 and the second metasurface MS2 is 0.5 mm.

Referring to FIGS. 4A to 4D, it may be seen that the chromatic aberration range may be varied by changing the interval between the first metasurface MS1 and the second metasurface MS2.

FIGS. 5A to 5D show focus characteristics of metalenses corresponding to four points ①, ②, ③, and ④ shown in FIG. 4A using a ray tracing technique.

FIGS. 5A to 5D show various combinations of focal lengths $f_1$ and $f_2$ of the first metasurface MS1 and the second metasurface MS2, which implement the same focal length $f_0$. Here, $f_0$, $f_1$, and $f_2$ are for light having a center wavelength of 800 nm. FIG. 5A to 5D illustrate that light at 700 nm and 900 nm forms focus at different positions. This focal dispersion $\Delta f$ is represented as chromatic aberration.

Figure 6:
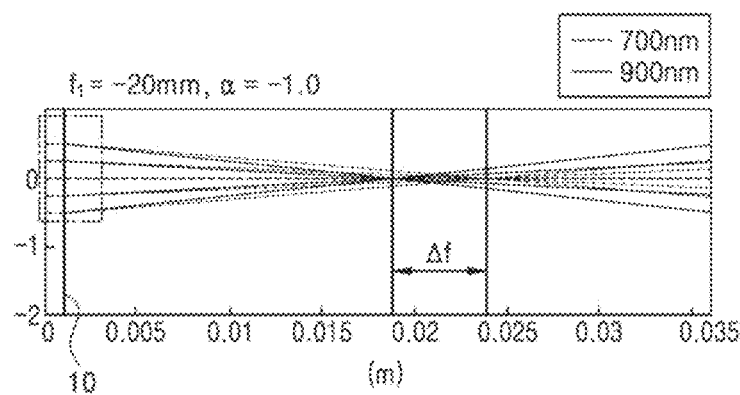
FIG. 6 shows focus characteristics in a metalens composed of one metasurface according to a related example.

FIG. 6 shows focus characteristics in a metalens composed of one metasurface according to a related example.

The metasurface 10 according to the related example exhibits one focal length and chromatic aberration determined according to a predetermined phase delay function represented by the metasurface 10.

In comparison with the related example, the metalens ML of the example embodiment may implement various focal lengths and chromatic aberrations by combining the phase delay functions of the two metasurfaces.

Figure 7:
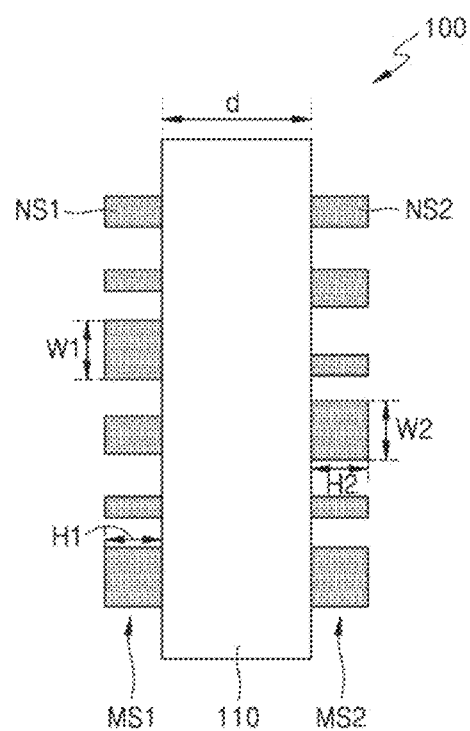
FIG. 7 is a cross-sectional view schematically showing a configuration of a metalens according to another example embodiment.

FIG. 7 is a cross-sectional view schematically showing the configuration of a metalens according to an example embodiment.

A metalens 100 includes a substrate 110 and a plurality of first nanostructures NS1 and a plurality of second nanostructures NS2 respectively formed on both surfaces of the substrate 110.

The plurality of first nanostructures NS1 have a first shape distribution and form a first metasurface MS1, and the plurality of second nanostructures NS2 have a second shape distribution and form a second metasurface MS2. As described above, the first shape distribution and the second shape distribution may be determined according to the phase delay functions $\varphi_1(r)$ and $\varphi_2(r)$ that the first metasurface MS1 and the second metasurface MS2 are to implement. The phase delay functions $\varphi1(r)$ and $\varphi2(r)$ may be determined considering optical performance to be implemented by the metalens 100 including the first metasurface MS1, the second metasurface MS2, and a combination thereof.

The shape distribution of the plurality of first nanostructures NS1 may be determined such that the first metasurface MS1 has a predetermined phase delay function indicating a positive refractive power.

The shape distribution of the plurality of second nanostructures NS2 may be determined such that the second metasurface MS2 has a predetermined phase delay function indicating a negative refractive power.

The first nanostructure NS1 has a width W1 and a height H1, and these values may vary depending on the position of the first nanostructure NS1. The second nanostructure NS2 has a width W2 and a height H2, and these values may vary depending on the position of the second nanostructure NS2.

The heights of the first nanostructure NS1 and the second nanostructure NS2 are all the same in FIG. 7, but embodiments are not limited thereto, and the heights of the first nanostructures NS1 and the second nanostructures NS2 may vary depending on the location of the nanostructures. For example, the plurality of first nanostructures NS1 may all have the same height, and the plurality of second nanostructures NS2 may all have the same height that is different from that of the plurality of first nanostructures NS1. However, embodiments are not limited thereto.

The substrate 110 supports the first nanostructure NS1 and the second nanostructure NS2, and may be made of a material having a refractive index that is different from a refractive index of the first nanostructure NS1 and a refractive index of the second nanostructure NS2. The difference in refractive index between the substrate 110 and the first nanostructures NS1 and the second nanostructures NS2 may be 0.5 or more. The refractive indexes of the first nanostructure NS1 and the second nanostructure NS2 may be higher than the refractive index of the substrate 110, but embodiments are not limited thereto.

The thickness of the substrate 110 may be determined to have an interval d set between the first metasurface MS1 and the second metasurface MS2.

The substrate 110 may be made of any one of glass (for example, fused silica, BK7, etc.), quartz, polymer (for example, PMMA, SU-8, etc.), and plastic, and may be a semiconductor substrate. The first nanostructure NS1 and the second nanostructure NS2 may include at least one of c-Si, p-Si, a-Si, III-V compound semiconductors (for example, GaP, GaN, GaAs, etc.), SiC, $TiO_2$, and SiN.

Hereinafter, a configuration of metalenses according to various example embodiments will be described. Hereinafter, the plurality of first nanostructures NS1 form a first metasurface MS1 according to the first shape distribution, and the plurality of second nanostructures NS2 form a second metasurface MS2 according to the second shape distribution. Each of the first metasurface MS1 and the second metasurface MS2 implement a predetermined phase delay function.

Figure 8:
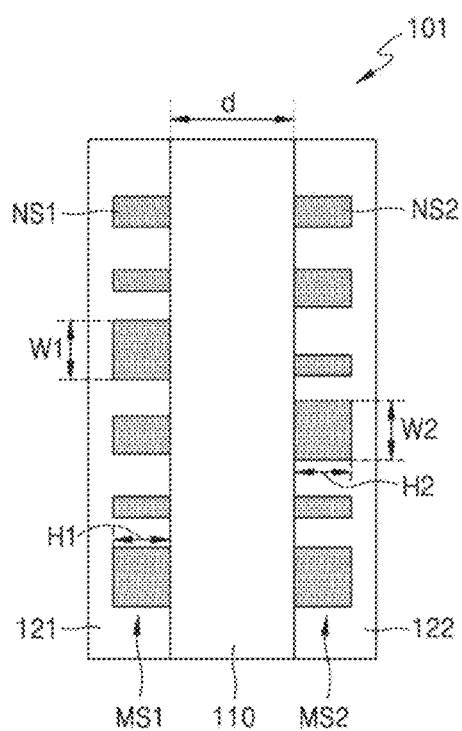
FIG. 8 is a cross-sectional view schematically showing a configuration of a metalens according to another example embodiment.

FIG. 8 is a cross-sectional view schematically showing a configuration of a metalens according to another example embodiment.

A metalens 101 according to the example embodiment further includes a first protective layer 121 covering a plurality of first nanostructures NS1 and a second protective layer 122 covering a plurality of second nanostructures NS2.

The difference in refractive index between the first protective layer 121 and the first nanostructure NS1 may be 0.5 or more, and the difference in refractive index between the second protective layer 122 and the second nanostructure NS2 may be 0.5 or more. The first protective layer 121 and the second protective layer 122 may be made of polymer materials such as SU-8 and PMMA.

The first protective layer 121 and the second protective layer 122 may have a refractive index lower than that of the first nanostructure NS1 and the second nanostructure NS2, respectively. However, embodiments are not limited thereto, and the refractive indexes may be reversed.

Figure 9:
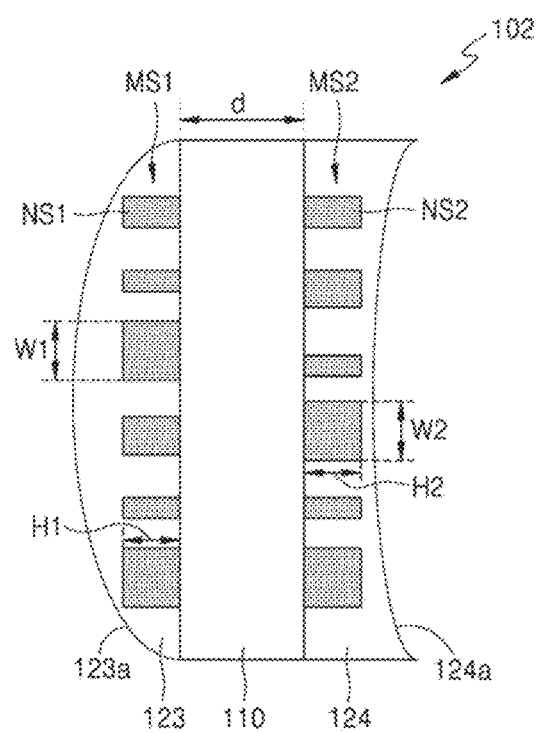
FIG. 9 is a cross-sectional view schematically showing a configuration of a metalens according to another example embodiment.

FIG. 9 is a cross-sectional view schematically showing a configuration of a metalens according to another example embodiment.

A metalens 102 of according to the example embodiment is different from the metalens 101 of FIG. 8 in that a first protective layer 123 and a second protective layer 124 have curved surfaces.

The first metasurface MS1 has a positive refractive power, and a surface 123a of the first protective layer 123 may be convex. The second metasurface MS2 has a negative refractive power, and a surface 124a of the second protective layer 124 may be concave. However, embodiments are not limited thereto.

In the drawing, although the surfaces 123a of the first protective layer 123 and the surfaces 124a of the second protective layer 124 are both shown to have curved surfaces, embodiments are not limited thereto. One of the surfaces 123a and 124a may be a curved surface, the other may be flat, and concave and convex surfaces thereof may be opposite to each other. The curved surfaces may be spherical or aspherical.

The first protective layer 123 and the second protective layer 124 may also have predetermined refractive powers, thereby compensating for the refractive powers of the first metasurface MS1 and the second metasurface MS2.

Figure 10:
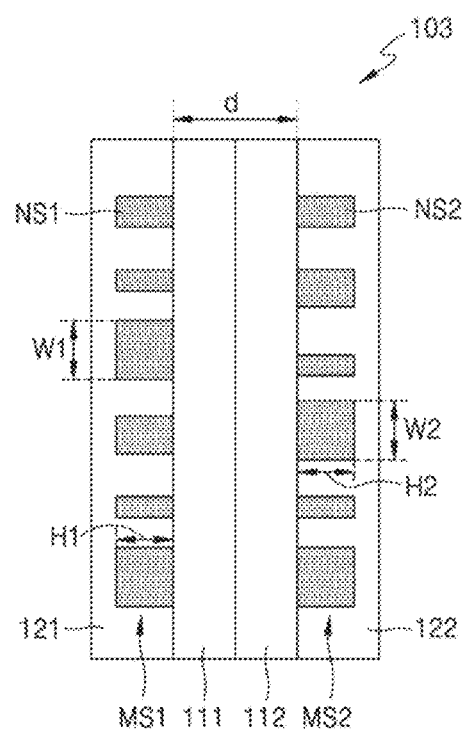
FIG. 10 is a cross-sectional view schematically showing a configuration of a metalens according to another example embodiment.

FIG. 10 is a cross-sectional view schematically showing a configuration of a metalens according to another example embodiment.

A metalens 103 includes a first substrate 111 supporting a plurality of first nanostructures NS1 and a second substrate 112 supporting a plurality of second nanostructures NS2.

The first substrate 111 and the second substrate 112 may be made of a material having a lower refractive index than the first nanostructure NS1 and the second nanostructure NS2. The surface opposite to the surface on which the first nanostructure NS1 is disposed in the first substrate 111 and the surface opposite to the surface on which the second nanostructure NS2 is disposed in the second substrate 112 may be bonded to each other. The sum of the thickness of the first substrate 111 and the thickness of the second substrate 112 may be determined to have an interval d set between the first metasurface MS1 and the second metasurface MS2.

In addition, a first protective layer 121 covering a plurality of first nanostructures NS1 and a second protective layer 122 covering a plurality of second nanostructures NS2 may be further provided. In FIG. 10, the first protective layer 121 and the second protective layer 122 are both shown to be flat, but embodiments are not limited thereto. For example, at least one of the first protective layer 121 and the second protective layer 122 may have a curved surface.

Figure 11:
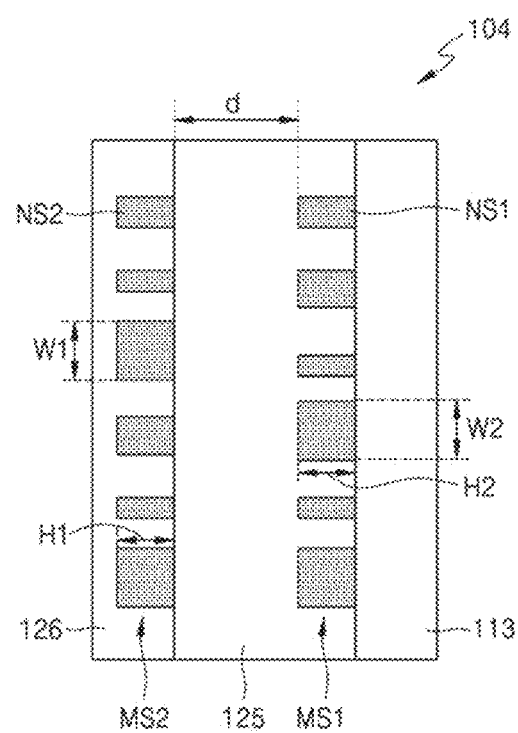
FIG. 11 is a cross-sectional view schematically showing a configuration of a metalens according to another example embodiment.

FIG. 11 is a cross-sectional view schematically showing a configuration of a metalens according to another example embodiment.

A metalens 104 includes a plurality of first nanostructures NS1 disposed on a substrate 113, a first protective layer 125 covering the plurality of first nanostructures NS1 and having a refractive index that is different from the first nanostructure NS1, a plurality of second nanostructures NS2 disposed on the first protective layer 125, and a second protective layer 126 covering the plurality of second nanostructures NS2 and having a refractive index that is different from the second nanostructures NS2.

The thickness of the first protective layer 125 may be determined to satisfy a distance d set between the first metasurface MS1 and the second metasurface MS2.

The difference in refractive index between the first protective layer 125 and the first nanostructure NS1 may be 0.5 or more, and the difference in refractive index between the second protective layer 126 and the second nanostructure NS2 may be 0.5 or more. The second protective layer 126 may be omitted.

Figure 12:
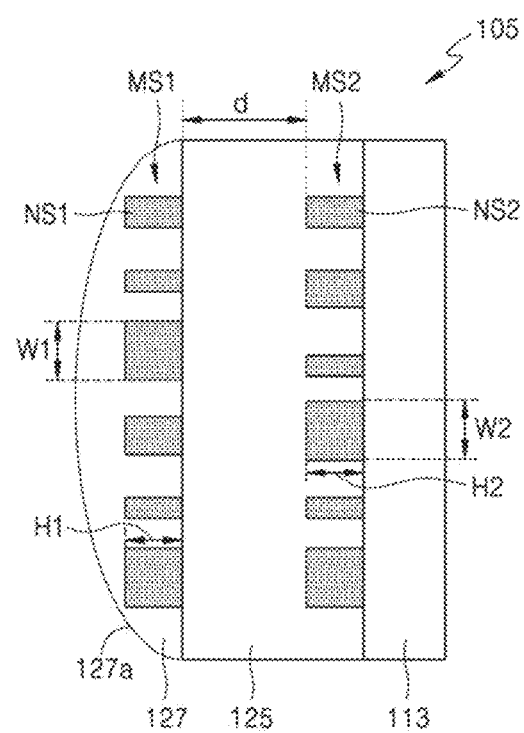
FIG. 12 is a cross-sectional view schematically showing a configuration of a metalens according to another example embodiment.

FIG. 12 is a cross-sectional view schematically showing a configuration of a metalens according to another example embodiment.

A metalens 105 according to the example embodiment is different from the metalens 104 of FIG. 11 in that a second protective layer 127 has a curved surface 127a. The curved surface 127a of the second protective layer 127 is shown convexly, but embodiments are not limited thereto, and the curved surface 127a may be concave.

Figure 13:
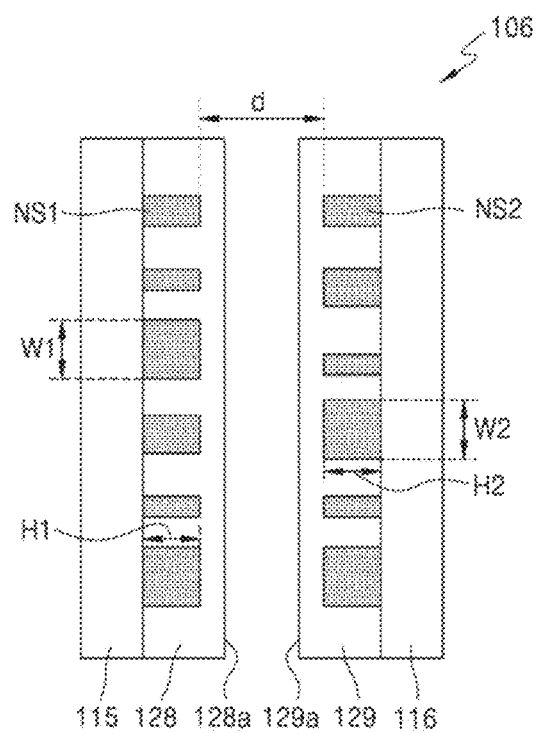
FIG. 13 is a cross-sectional view schematically showing a configuration of a metalens according to another example embodiment.

FIG. 13 is a cross-sectional view schematically showing a configuration of a metalens according to another example embodiment.

A metalens 106 according to the example embodiment includes a plurality of first nanostructures NS1 disposed on a first substrate 115 and a plurality of second nanostructures NS2 disposed on a second substrate 116. In addition, a first protective layer 128 covering the plurality of first nanostructures NS1 and a second protective layer 129 covering the plurality of second nanostructures NS2 may be further provided. The plurality of first nanostructures NS1 and the second nanostructures NS2 are arranged to face each other, that is, the first protective layer 128 and the second protective layer 129 are arranged to face each other. The separation distance between the first protective layer 128 and the second protective layer 129 is determined to satisfy the distance d set between the first metasurface MS1 and the second metasurface MS2.

In FIG. 13, the first protective layer 128 and the second protective layer 129 are both shown to be flat, but embodiments are not limited thereto, and any one of the first protective layer 128 and the second protective layer 129 may have a curved surface. The first protective layer 128 and the second protective layer 129 may be omitted.

The metalenses 100, 101, 102, 103, 104, 105, and 106 described above may set the phase delay function of each metasurface through the nanostructure shape distribution provided therein, and may implement a desired focal length and chromatic aberration for light having a wavelength of a predetermined bandwidth, such that the metalenses 100, 101, 102, 103, 104, 105, and 106 may be applied to various optical apparatuses.

Each of the metalenses 100, 101, 102, 103, 104, 105, and 106 described above has been illustrated as having two metasurfaces, but may include three or more metasurfaces to be suitable for the desired refractive power and chromatic aberration.

Figure 14:
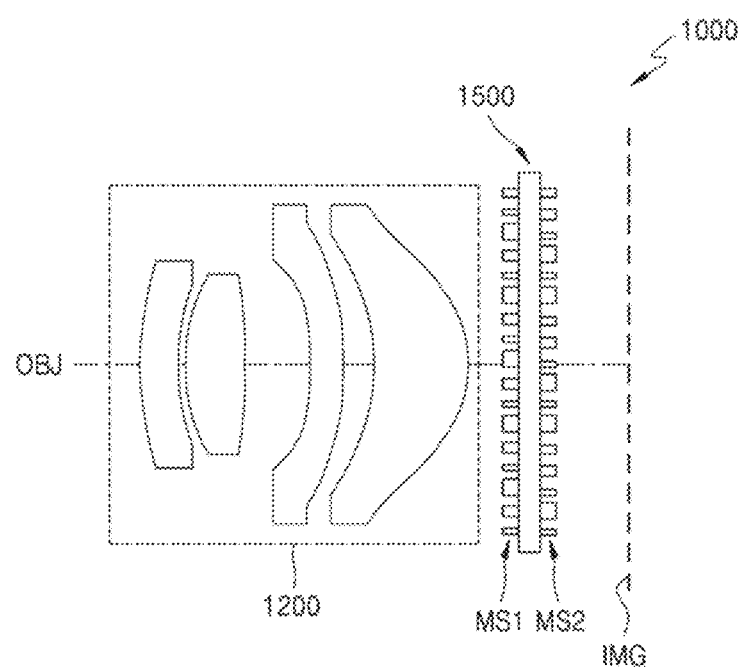
FIG. 14 schematically shows the configuration and optical arrangement of an imaging lens according to an example embodiment.

FIG. 14 schematically shows the configuration and optical arrangement of an imaging lens according to an example embodiment.

An imaging lens 1000 includes a lens assembly 1200 including one or more refractive lenses and a metalens 1500.

The metalens 1500 includes a first metasurface MS1 and a second metasurface MS2 spaced apart from each other by a predetermined distance, and a metalens according to the above-described example embodiments and combinations thereof may be employed.

The metalens 1500 may have chromatic aberration that reduces chromatic aberration caused by the lens assembly 1200. The metalens 1500 may be set such that there is no substantial refractive power, that is, the focal length of the imaging lens 1000 may be substantially the same as that of the lens assembly 1200. However, embodiments are not limited thereto. In addition, the shape and number of lenses provided in the lens assembly 1200 are exemplary, and may be changed to various other shapes and numbers.

Figure 15:
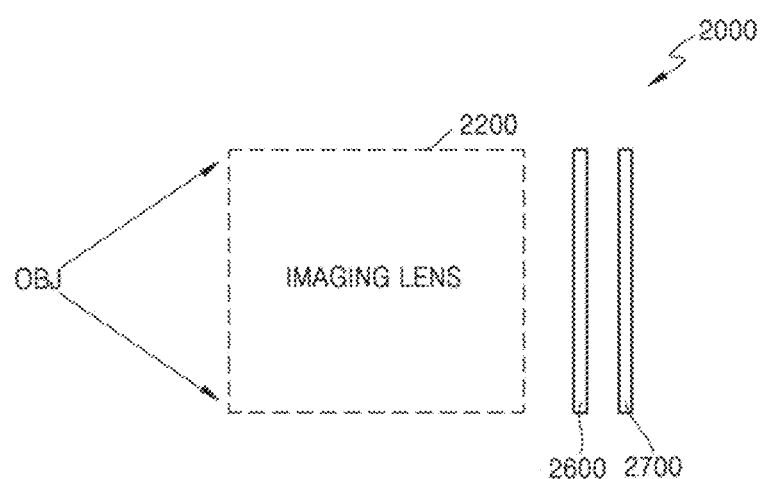
FIG. 15 schematically shows the configuration and optical arrangement of an imaging device according to an example embodiment.

FIG. 15 schematically shows the configuration and optical arrangement of an imaging device according to an example embodiment.

An imaging device 2000 includes an imaging lens 2200 and an image sensor 2700 that converts an optical image of an object OBJ formed by the imaging lens 2200 into an electrical signal. A cover glass 2600 may be disposed between the imaging lens 2200 and the image sensor 2700, and an infrared cut filter may be coated on the cover glass 2600.

The image sensor 2700 may be disposed at an upper surface position where an optical image of the object OBJ is formed by the imaging lens 2200. The image sensor 2700 may include an array of CCD, CMOS, photodiode, etc. that may sense light and generate electrical signals.

The imaging lens 2200 may include one or more metalenses. The imaging lens 2200 may be a configuration in which a general refractive lens and a metalens are combined, or may be made of only a plurality of metalenses.

The above-described metalens and the optical apparatus including the same have been described with reference to the example embodiment shown in the drawings, but this is merely an example, and those skilled in the art will understand that various modifications and other equivalent embodiments are possible therefrom. Therefore, the example embodiments should be considered in descriptive sense only not in limited perspective sense. The scope of this specification is defined not by the detailed description of the invention but by the appended claims, and all differences within the scope will be construed as being included in the present disclosure.

The above-mentioned metalens includes two metasurfaces, and by setting the phase delay function of each metasurface and the distance between metasurfaces, desired refractive power and chromatic aberration may be implemented for light in a desired wavelength band.

The above-mentioned metalens may be applied as an imaging lens with improved chromatic aberration in combination with a general refractive lens, and may be employed in various optical apparatuses such as imaging devices.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A metalens comprising:
a first metasurface comprising a plurality of first nanostructures disposed based on a first shape distribution; and
a second metasurface spaced apart from the first metasurface at a distance greater than a central wavelength of a predetermined wavelength band, the second metasurface comprising a plurality of second nanostructures disposed based on a second shape distribution,
wherein the metalens provides chromatic aberration for light in the predetermined wavelength band.

2. The metalens of claim 1, wherein the first metasurface is configured to delay a phase of incident light based on the first shape distribution by a phase delay equation:

$$\varphi_1(r)=ar^2,$$

where r is a distance from a center of the first metasurface to a position of the incident light, and a is a real number.

3. The metalens of claim 2, wherein the first shape distribution is determined such that the phase delay equation of the first metasurface with respect to light of different wavelengths in the predetermined wavelength band is equal.

4. The metalens of claim 2, wherein the second metasurface is configured to delay a phase of incident light based on the second shape distribution by a phase delay equation:

$$\varphi_2(r)=br^2,$$

where r is the distance from a center of the second metasurface to a position of the incident light, and b is a real number that is different from a.

5. The metalens of claim 4, wherein the second shape distribution is determined such that the phase delay equation of the second metasurface with respect to light of different wavelengths in the predetermined wavelength band is equal.

6. The metalens of claim 1, wherein one of the first metasurface and the second metasurface has a positive refractive power and the other of the first metasurface and the second metasurface has a negative refractive power with respect to light of the central wavelength.

7. The metalens of claim 1, wherein a first focal length of the first metasurface with respect to light of the central wavelength, a second focal length of the second metasurface with respect to the light of the central wavelength, and the distance between the first metasurface and the second metasurface are set such that a refractive power of the metalens with respect to the light of the central wavelength is zero.

8. The metalens of claim 1, wherein the distance between the first metasurface and the second metasurface is greater than five times the central wavelength.

9. The metalens of claim 1, wherein the predetermined wavelength band is included in a wavelength band from visible light to infrared light.

10. The metalens of claim 1, wherein each of the plurality of first nanostructures and each of the plurality of second nanostructures respectively has a column shape.

11. The metalens of claim 10, wherein a width of each of the plurality of first nanostructures and a width of each of the plurality of second nanostructures are less than the central wavelength.

12. The metalens of claim 10, wherein a height of each of the plurality of first nanostructures and a height of each of the plurality of second nanostructures are equal to or greater than half of the central wavelength.

13. The metalens of claim 1, further comprising a substrate having a first surface and a second surface facing each other,
wherein the plurality of first nanostructures are disposed on the first surface,
wherein the plurality of second nanostructures are disposed on the second surface.

14. The metalens of claim 13, further comprising:
a first protective layer covering the plurality of first nanostructures and comprising a material having a refractive index lower than a refractive index of each of the plurality of first nanostructures; and
a second protective layer covering the plurality of second nanostructures and comprising a material having a refractive index lower than a refractive index of each of the plurality of second nanostructures.

15. The metalens of claim 14, wherein at least one of the first protective layer and the second protective layer has a curved surface.

16. The metalens of claim 15, wherein one of the first protective layer and the second protective layer has a convex curved surface, and the other has a concave curved surface.

17. The metalens of claim 1, further comprising:
a first substrate, the plurality of first nanostructures being disposed on the first substrate; and
a second substrate, the plurality of second nanostructures being disposed on the second substrate.

18. The metalens of claim 17, further comprising:
a first protective layer covering the plurality of first nanostructures and comprising a material having a refractive index lower than a refractive index of each of the plurality of first nanostructures; and
a second protective layer configured to cover the plurality of second nanostructures and comprising a material having a refractive index lower than a refractive index of each of the plurality of second nanostructures.

19. The metalens of claim 18, wherein at least one of the first protective layer and the second protective layer has a curved surface.

20. The metalens of claim 17, wherein
a back surface opposite to a surface of the first substrate on which the plurality of first nanostructures are disposed and a back surface opposite to a surface of the second substrate on which the plurality of second nanostructures are disposed are bonded to each other.

21. The metalens of claim 17, wherein the plurality of first nanostructures and the plurality of second nanostructures are disposed to face each other.

22. The metalens of claim 1, further comprising:
a substrate, the plurality of first nanostructures being disposed on the substrate; and
a first protective layer covering the plurality of first nanostructures and comprising a material having a refractive index lower than a refractive index of each of the plurality of first nanostructures,
wherein the plurality of second nanostructures are disposed on the first protective layer.

23. The metalens of claim 22, further comprising a second protective layer covering the plurality of second nanostructures and comprising a material having a refractive index lower than a refractive index of each of the plurality of second nanostructures.

24. The metalens of claim 23, wherein the second protective layer has a curved surface.

25. An imaging lens comprising:
a lens assembly comprising one or more refractive lenses; and
a metalens comprising:
a first metasurface comprising a plurality of first nanostructures disposed based on a first shape distribution; and
a second metasurface spaced apart from the first metasurface at a distance greater than a central wavelength of a predetermined wavelength band, the second metasurface comprising a plurality of second nanostructures disposed based on a second shape distribution,
wherein the metalens provides chromatic aberration for light in the predetermined wavelength band.

26. The imaging lens of claim 25, wherein the chromatic aberration provided by the metalens lowers the chromatic aberration provided by the lens assembly, and
wherein a focal length of the imaging lens is equal to a focal length of the lens assembly.

27. An imaging device comprising:
an imaging lens comprising:
a lens assembly comprising one or more refractive lenses; and
a metalens comprising:
a first metasurface comprising a plurality of first nanostructures disposed based on a first shape distribution; and
a second metasurface spaced apart from the first metasurface at a distance greater than a central wavelength of a predetermined wavelength band, the second metasurface comprising a plurality of second nanostructures disposed based on a second shape distribution,
wherein the metalens provides chromatic aberration for light in the predetermined wavelength band; and
an image sensor configured to convert an optical image formed by the imaging lens into an electrical signal.

* * * * *